United States Patent [19]

Childers, III et al.

[11] Patent Number: 5,444,690
[45] Date of Patent: Aug. 22, 1995

[54] LEAF SPRING LOCK FOR A CARRIAGE IN A MEDIA PLAYER THAT IS ACTUATED BY THE CARRIAGE AND POSITION OF A CARTRIDGE

[75] Inventors: Edwin R. Childers, III; Michael Henry, both of Tucson, Ariz.; Masaru Nemoto, Hadano, Japan

[73] Assignee: International Business Machines Corporation, Armonk, N.Y.

[21] Appl. No.: 151,237

[22] Filed: Nov. 12, 1993

[51] Int. Cl.6 .............................................. G11B 17/04
[52] U.S. Cl. ..................................... 369/263; 369/244; 369/215
[58] Field of Search ..................... 369/263, 244, 77.2, 369/257, 215; 360/107, 109

[56] References Cited

U.S. PATENT DOCUMENTS

| | | | |
|---|---|---|---|
| 4,472,796 | 9/1984 | Torrington | 369/77.2 |
| 4,574,372 | 3/1986 | Costemore d'Arc | 369/244 |
| 4,899,328 | 2/1990 | Ishii et al. | 369/77.2 |
| 4,987,506 | 1/1991 | Uehara | 360/105 |
| 5,012,462 | 4/1991 | Tsujita | 369/77.1 |
| 5,130,973 | 7/1992 | Nakazima | 369/244 |
| 5,243,591 | 9/1993 | Mogamiya | 369/244 |
| 5,267,227 | 11/1993 | Nanke | 369/77.1 |

FOREIGN PATENT DOCUMENTS

| | | | |
|---|---|---|---|
| 63-184976 | 7/1988 | Japan | 369/244 |
| 63-224088 | 9/1988 | Japan | 369/244 |
| 1-151020 | 6/1989 | Japan | 369/244 |
| 2-199683 | 8/1990 | Japan | 369/244 |

Primary Examiner—John H. Wolff
Assistant Examiner—William R. Korzuch
Attorney, Agent, or Firm—H. F. Somermeyer

[57] ABSTRACT

An optical disk player has a controller circuit board attached to a cartridge receiver. A universal head, actuator (head carriage) and spindle motor assembly (HASA) module is attached to the receiving mechanism. The actuator carries an optical head assembly along a predetermined path contiguous with a transducer access opening of a cartridge in the receiver and radially of an optical disk in the cartridge. A leaf spring is mounted in a bottom portion of the module and extends along the predetermined path toward a disk mounting spindle. The leaf spring has an upstanding end portion between the spindle and the predetermined path. While the head carriage is disposed closely to the spindle and the receiver is in a load-unload position, a detent on the head carriage is engaged in an aperture in the spring that is adjacent the upstanding end portion. As the receiver moves to the load position, the cartridge contacts the upstanding portion flexing the spring away from the carriage freeing it for reciprocating motions. Movement of the carriage to the predetermined position while the receiver is in the unload position enables locking the carriage against movement along the predetermined path.

12 Claims, 3 Drawing Sheets

LEAF SPRING LOCK FOR A CARRIAGE IN A MEDIA PLAYER THAT IS ACTUATED BY THE CARRIAGE AND POSITION OF A CARTRIDGE

FIELD OF THE INVENTION

The present invention relates to media players, particularly to optical disk players, in which a transducer carriage is automatically selectively locked for preventing movement of the carriage.

BACKGROUND OF THE INVENTION

Disk players have provided locking a transducer carriage against unintended movement whenever a disk cartridge or other medium is not in a play position in the player. Such locking prevents damage to the transducer carriage during shipment and when the media player is not being used. These locking mechanisms often employed complex or power driven mechanisms, either of which result in higher costs. These prior carriage locks also responded to operation of a cartridge holder for locking or unlocking the transducer carriage against or for movements. Such locking and unlocking mechanisms most often are dependent upon specific types of cartridge loaders-unloaders (also termed cartridge receivers). It is desired to avoid dependency of a carriage lock mechanism upon cartridge holder designs. It is also desired to reduce the costs of automatic transducer carriage locking and unlocking.

DISCUSSION OF PRIOR ART

Torrington in U.S. Pat. No. 4,472,796 shows an optical video disk player having a transducer carriage locking mechanism. This mechanism includes a plate (slidable locking lever) having a locking pin engagable with a transducer carriage. The plate is moved into a carriage locking position by a power actuator for movement transverse to the direction of carriage reciprocating motion. A push back spring acts on the carriage lock to release the carriage for reciprocating motions. As the video disk caddy (holder) moves a video disk into play position, the caddy engages the spring pushing for retracting the locking pin from the transducer carriage. It is desired to provide a lower cost and more effective automatic transducer carriage locking mechanism than shown in this patent reference.

Uehara U.S. Pat. No. 4,987,506 shows a cartridge loader-actuated rotatable clamp lever disposed in a plane parallel to the plane of a cartridge loader-unloader. A spring yieldably urges the rotatable clamp lever to a restricted position for locking a transducer carriage against movement. A spring-urged L-shaped lever, urged by a loader-unloader for moving a cartridge to play position opens a shutter in a cartridge being inserted, rotates in a plane parallel to the loader-unloader for overcoming the two spring forces for rotating the clamp lever out of locking engagement with the transducer carriage. It is desired to provide an automatic cartridge carriage lock that avoids a plurality of levers and is independent of loader-unloader design details.

Tsujita in U.S. Pat. No. 5,012,462 shows a carriage lock consisting of a pair of facing toothed-rack members. One of the rack members is mounted on a cartridge loader-unloader while a second rack member is supported and carried by a transducer carriage. As the loader-unloader moves from a play position to a load-unload position the rack members engage each other for locking the transducer carriage to the loader-unloader. Similarly, as the loader-unloader moves from the load-unload position to the play position, the rack members are separated. A U-shaped bracket on the loader-unloader supports one rack member for enabling the above-described lock and unlock operations. It is desired to further simplify and cost-reduce a transducer carriage lock.

Ishii et al in U.S. Pat. No. 4,899,328 show a carriage lock mechanism using a plurality of mechanical link members. The locking and unlocking employs a solenoid for powering the lock mechanism. It is desired to avoid requiring a separate power apparatus for a transducer carriage locking mechanism.

d'Arc in U.S. Pat. No. 4,574,372 shows another solenoid powered transducer carriage lock arrangement. The solenoid overcomes spring urging to unlock the transducer carriage. Again, it is desired to avoid requiring a separate power apparatus for a carriage lock-unlock mechanism.

Yoshida in Japanese published application 2-199683, printed Aug. 8, 1990, as best understood, shows an automatic transducer carriage locking apparatus. A spring urges a pivoting lever to engage a transducer carriage for locking it against movement. A cartridge loading-unloading member actuates the pivoting lever for unlocking the transducer carriage for movement. It is desired to avoid a need for a pivoting lever in providing a transducer carriage lock and to make the transducer carriage substantially independent of cartridge loader-unloader design.

Fujino in Japanese published application 1-151020, printed Jun. 13, 1989, as best understood, shows a coil spring disposed between a frame and a pivoted arm and extending under a transducer carriage. While there is no cartridge in a cartridge receiver, the coil spring is relaxed from tension for engaging a transducer carriage over its length for restraining its movement. Insertion of a cartridge engages the pivoted arm for pivoting and elongating the spring to place in under tension. The elongation of the coil spring slightly reduces its diameter with the pivoting disengages the spring from the transducer carriage. Engagement by a coiled spring over the length of a delicate transducer carriage and a close proximity of a coil spring to a moving transducer carriage is desired to be avoided for better ensuring against unintended negative effects on carriage operation. Also, it is desired to simplify construction of a transducer carriage locking arrangement with respect to the Fujino pivoting lever and coil spring arrangement.

Hayashi in Japanese published application 63-224088, printed Sep. 19, 1988, as best understood, shows a hand operated transducer carriage locking and unlocking apparatus.

Hayashi in Japanese published application 63-184976, printed Jul. 30, 1998, as best understood, shows a second hand operated transducer carriage locking and unlocking apparatus. In this instance, a screw adjusts a pivoted locking lever to lock or release a transducer carriage for movement. It is desired to avoid manual actuation of a transducer carriage locking mechanism as shown in these two last references.

SUMMARY OF THE INVENTION

The present invention provides a resilient member disposed adjacent to a transducer carriage that selectively locks the transducer carriage against movements when the transducer carriage is in a predetermined position and a load-unload position occurs in a cartridge load-unload apparatus.

A cartridge media playing apparatus in accordance with the present invention has a cartridge receiver. The cartridge receiver is movable between load-unload and play positions for enabling access to a medium contained in said cartridge in the play position. Each medium in said cartridge has a plurality of spaced apart recording areas that are accessible through a medium access opening. A movable lockable transducer support means is disposed for reciprocating motions along a predetermined path across the medium access opening for accessing different zones of said recording areas on the medium. A sub-frame supports the movable transducer support means for said reciprocating motions. Resilient means, such as a leaf spring, mounted on a stationary plate mounted on the sub-frame yieldably moves in a direction toward said medium access opening and is positioned to engage said cartridge/receiver while in the play position. Movable transducer support means latch lock means has a latch means for engaging a catch lock means for retaining said movable transducer support means in a predetermined position aligned with said medium access opening. The catch means has an aperture for removably receiving the latch means. A cartridge lodged in a receiver in the play position contacts and pushes the resilient means toward the stationary plate for releasing the lock means to free said movable transducer support means for its reciprocating motions to access tracks of a record medium in the cartridge. The cartridge and receiver while in the load-unload position is out of contact with the resilient means for allowing the resilient means to lock said movable transducer support means against movement in the predetermined position.

The foregoing and other objects, features and advantages of the invention will be apparent from the following more particular description of preferred embodiments of the invention, as illustrated in the accompanying drawings.

Figure 1:
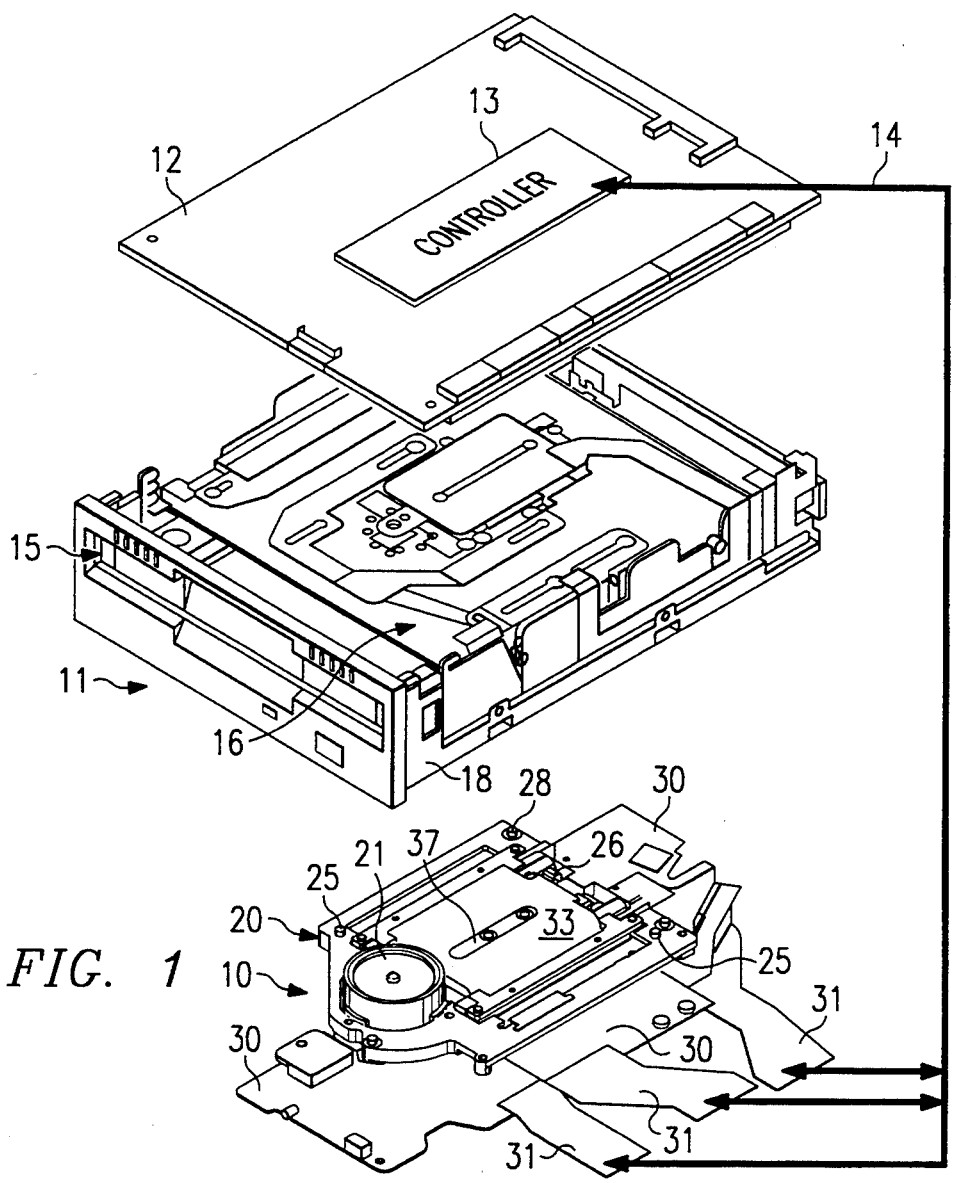
FIG. 1 is a simplified exploded view of a media drive that incorporates the present invention and diagrammatically shows a controller.

FIG'S. 3-5 diagrammatically illustrate three positions of a transducer support carriage in locked, unlocked and lockable positions in the FIG. 1 illustrated media drive. The views are in an orientation reversed from the FIG'S. 1 and 2 orientation.

Figure 2:
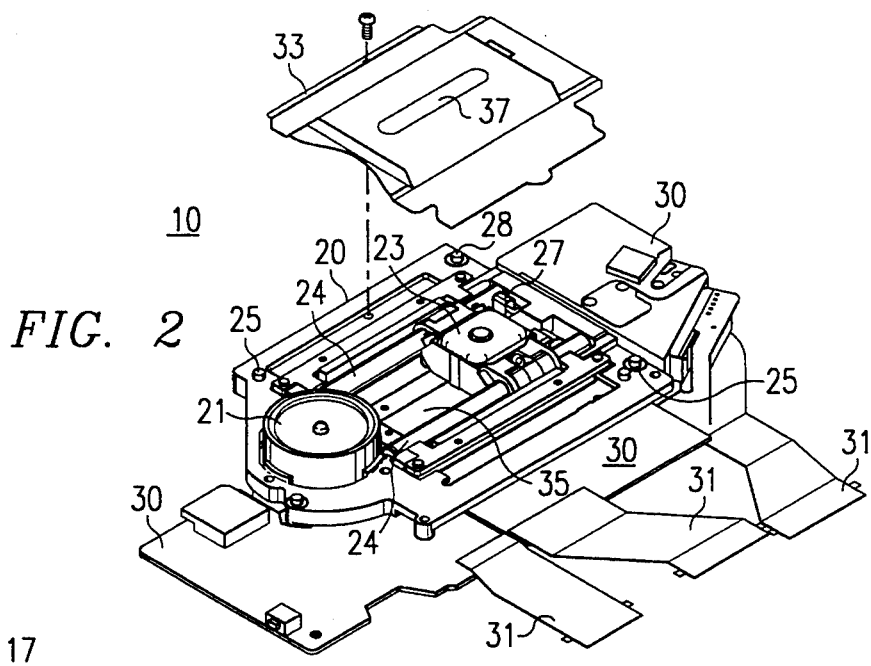
FIG. 2 is a perspective partially exploded view of a universal head, actuator and spindle motor assembly (HASA) made in accordance with present invention and that is usable in the FIG. 1 illustrated media drive.
Figure 6:
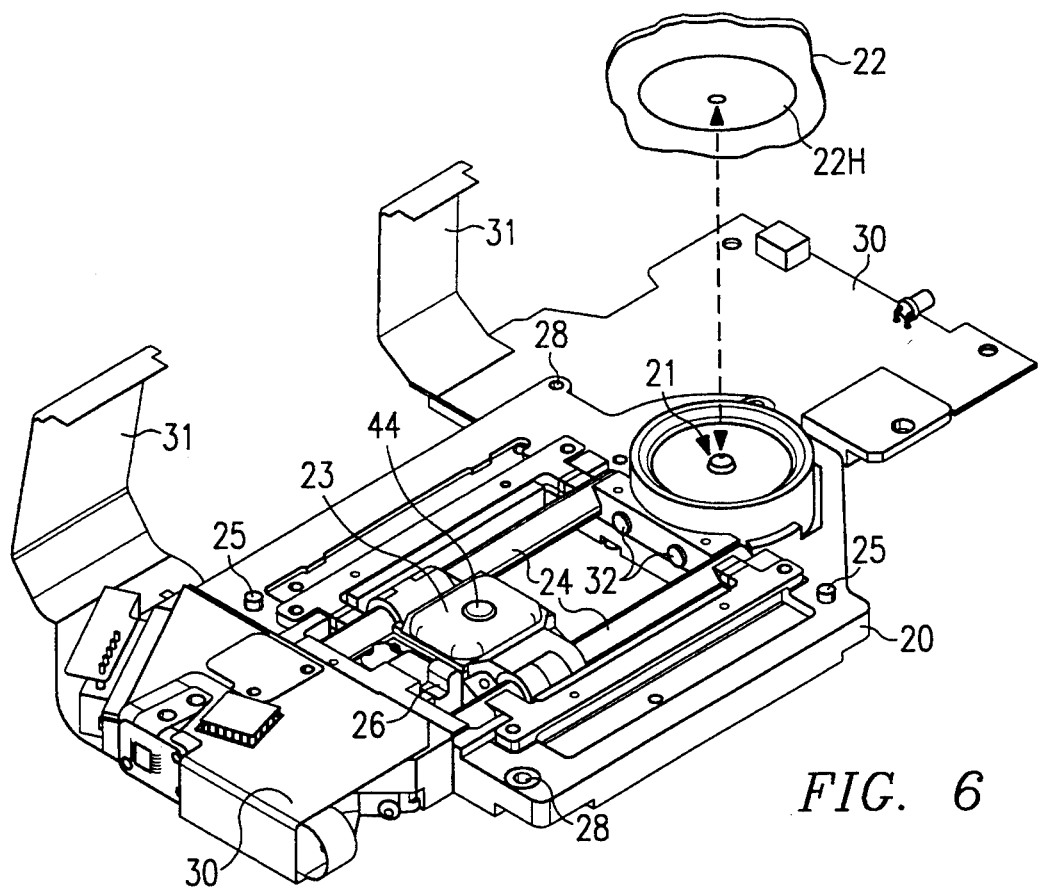

FIG. 6 is a perspective view of portion of the FIG. 2 illustrated HASA.

Figure 7:
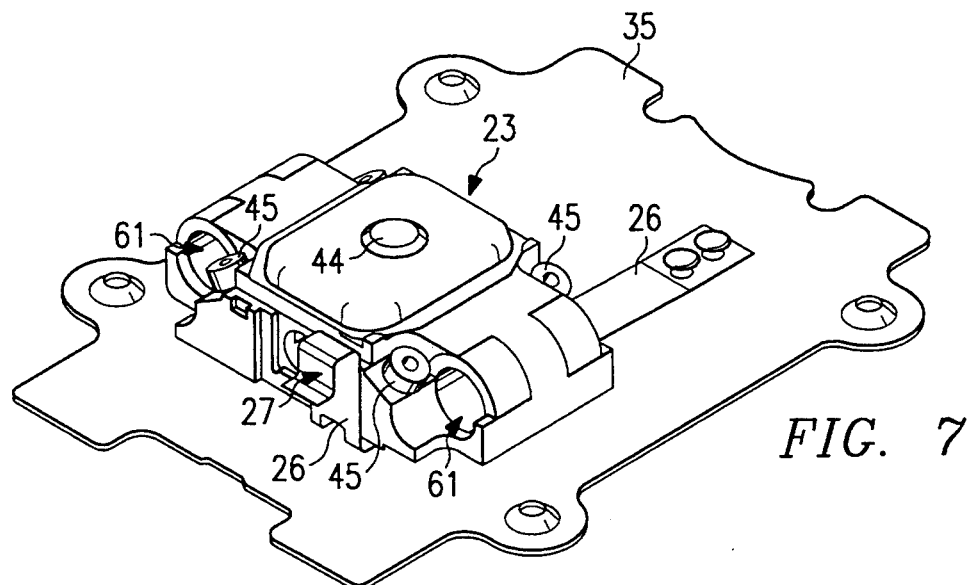

FIG. 7 is a simplified perspective view of a selected portion of HASA shown in FIG. 2.

Figure 8:
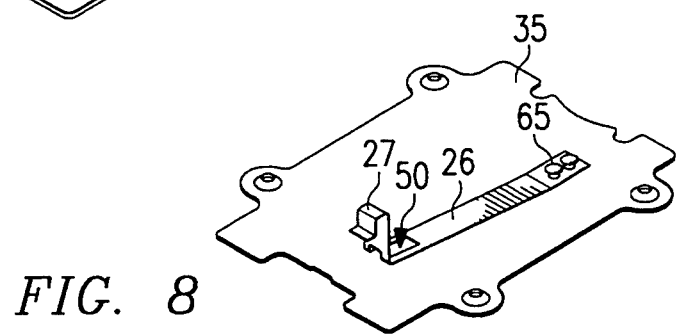

FIG. 8 illustrates a leaf spring locking catch member mounted on a stationary plate ready for being assembled in the FIG. 2 illustrated HASA.

Figure 9:
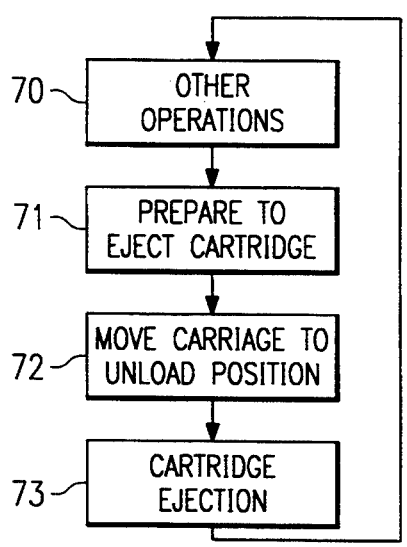

FIG. 9 is a simplified machine operations chart showing controlling ejection of a cartridge from the FIG. 1 illustrated media drive.

DETAILED DESCRIPTION

Referring now more particularly to the appended drawing, like numerals indicate like parts and structural features in the various figures. FIG. 1 is an exploded view of an optical disk device employing the present invention. Numeral 10 denotes a universal subassembly (also shown in FIG'S. 2-8) having an optical head, actuator (including a movable transducer carriage) and spindle motor assembly (HASA) constructed using the present invention. Cartridge loader-unloader mechanism 11 subassembly is of known construction. An optical disk cartridge electronic circuit board 12 subassembly contains disk drive control circuits, such as those circuits usually incorporated into drive-integrated controller 13. All three subassemblies 10-12 are suitably affixed to drive base 18 located in subassembly 11. Electronic controller 13 is attached to the disk drive via interface 14 that is attached to flat electronic cables 31 of the illustrated disk drive. Loader-unloader mechanism 11 includes cartridge 17 receiving slot 15 (FIG'S. 3-5). A cartridge receiver (loader-unloader) mechanism 16 receives cartridge 17 in a so-called load-unload position 53 (FIG'S. 3-5). Mechanism 16 includes a suitable frame shock mounted to base 18. Upon receiving cartridge 17, mechanism 16 moves the received cartridge from the load-unload position to a play position (FIG'S. 3-5), as is known.

Figure 4:
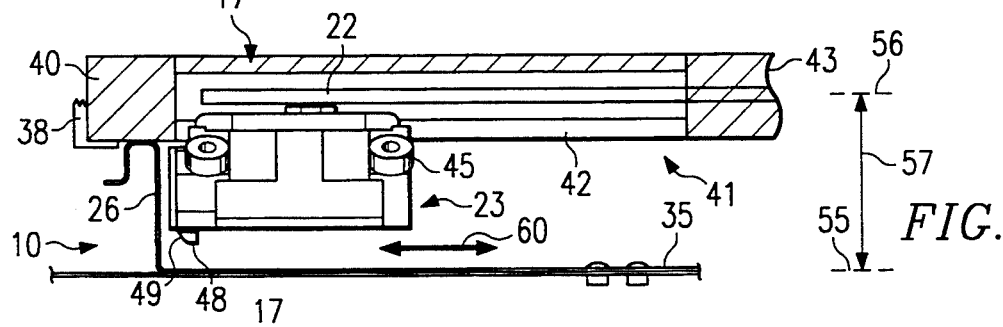

HASA 10 includes sub-frame 20 that is fixedly secured to the frame of mechanism 16, such as by metal screws or bolts. HASA 10 includes spindle motor and spindle component 21 for engaging and rotating optical disk 22 (FIG. 6) at its hub 22H within cartridge 17 in the play position at 56 (FIG. 4). Optical transducer (optical lens 44, optical detectors, beam splitters and laser (not separately shown), for example) mounting carriage 23 is mounted on spaced-apart parallel longitudinally-extending rails 24 for reciprocating motions (see double-headed arrow 60 of FIG. 4) to move the lens 44 to scan addressed ones of data-storing tracks (not shown) of disk 22. Position locator 25 and mounting holes 28 (FIG. 6) of HASA 10 precisely align and attach HASA 10 to mechanism 16. In one aspect of the present invention carriage 23 is selectively retained in a predetermined position on rails 24 by carriage-locking spring 26 (FIG'S. 1-8) having an upstanding actuating portion 27 at its distal end. A cartridge 17 in play position engages portion 27 for pushing spring 26 toward its support plate 35 to release carriage 23 for movement. This operation is described later with respect to FIG'S. 3-5.

HASA 10 also includes a plurality of special purpose electronic circuit boards 30, each of which is attached to controller 13 or board 12 via flat flexible electrical conductor cables 31. Electronic circuit boards 30 include electronic circuits for controlling and actuating a laser (not shown) in transducer carriage 23, read back preamplifier circuits, eject control circuits, focus circuits, spindle motor control circuits, track following circuits and the like. Two resilient carriage crash stops 32 (FIG. 6) affixed to sub-frame 20 protect carriage 23, as is known.

Upper protective cover 33 (FIG'S. 1 and 2) on carriage 23 includes elongated laser beam slot 37 for passing a laser beam between the transducer lens 44 and a recording surface of optical disk 22. Cover 33 is suitably bolted on sub-frame 20. Stationary plate (FIG'S. 6-8) affixed to sub-frame 20 stationarily supports locking spring 26, such as by rivets at end 65 of spring 26. Stationary plate 35 also covers the lower side of HASA 10.

Figure 3:
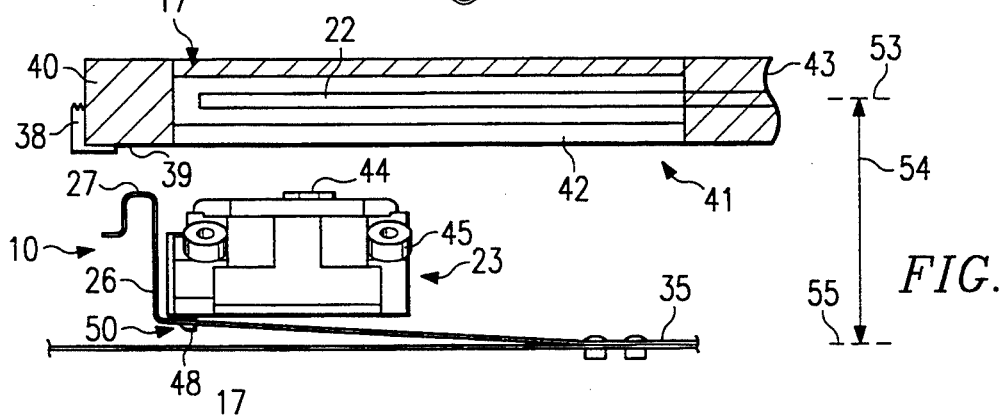
Figure 5:
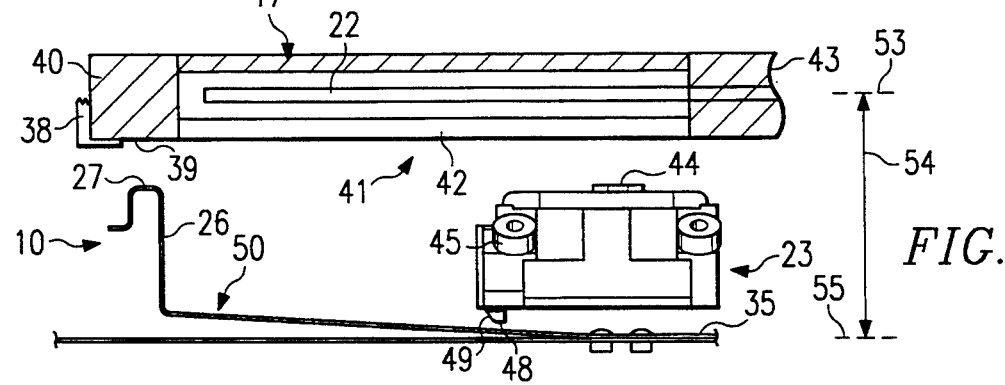

FIG'S. 3-5 respectively diagrammatically show carriage 23 in locked against movement at a predetermined position along its path of travel, unlocked for movement as indicated by double-headed arrow 60 and in a lockable position with cartridge 17 in the load-unload position 53. While cartridge 17 is at the load-unload position 53 (FIG. 3), spring 26 is permitted to flex slightly substantially-linearly away from stationary plate 35 toward the load-unload position 53 for locking carriage 23 against movement. Depending latch 48 of carriage 23 extends through locking-catch aperture 50 (best seen in FIG. 8) in spring 26 for locking carriage 23 against movement. Latch 48 has ramp surface 49 to facilitate carriage 23 movement toward the predetermined position (FIG. 3) for sliding along spring 26 toward distal end 27 for engaging spring 26 in catch aperture 50. Therefore, as best seen in FIG. 5, if carriage 23 is not in the predetermined position when cartridge 17 moved from play position 56 to load-unload position 53, carriage 23 is actuated to move to its radially outwardmost position, the predetermined position, for lockingly engaging spring 26. Such carriage locking movement in the FIG. 5 illustration may be manually effected by urging carriage 23 to the predetermined position, such as by tilting the illustrated drive to cause carriage 23 to roll to the predetermined position.

Moving cartridge 17 from its load-unload position 53 to play position 56, indicated by double-headed arrow 57, moves spring-engaging surface 39 of cartridge housing 40 to contact upstanding end portion 27 of spring 26 for substantially linearly pushing the end portion 27 toward stationary plate 35 moving spring 26 out of engagement from depending latch (best seen in FIG. 4). A portion 38 of cartridge receiver 16 may extend over surface 39 for being substituted for spring-engaging surface 39. Since it is desired not to move carriage 23 without a cartridge present in the play position, it is preferred that cartridge surface 39 disengages carriage 23 from spring 26. Cartridge receiver 16 (FIG. 1) carries cartridge 17 down to play position for engaging hub 22H (FIG. 6) with spindle 21 for enabling disk 22 rotation within housing 40. Housing 40 includes the usual disk access aperture 41 (may be shuttered, as is known) bounded by wall edge portion 42 of housing 40. Note that upstanding portion 27 is positioned radially outward from a radially outwardmost travel of carriage 23, i.e. next to spindle 21. Movement of cartridge receiver 16 has a vector component parallel to the rotation axis of spindle 21.

From the above description, it is seen that carriage 23 can be automatically put in locking engagement with spring 26 by either of two procedures. First, controller 13 effects positioning carriage 23 to the predetermined position (seen in FIG'S. 3 and 4). Then controller 13 actuates loader-unloader mechanism 16 to move cartridge 17 to the unload position 53 for allowing spring 26 to flex into locking engagement with latching detent 48. Second, controller 13 actuates loader-unloader mechanism 16 to eject cartridge 17 irrespective of the current position of carriage 23 (FIG. 5). Then controller 13 actuates carriage 23 to move to the predetermined position for effecting locking engagement between carriage 13 and spring 26.

Carriage 23 has a travel path determined by rails 24 (FIG. 6) that is radial of disk 22. The radial extent of such travel is indicated by the radial extent of aperture 41. FIG'S. 3-5 include a partial cutaway view of cartridge 17. Cutaway end 43 is the radial inwardmost portion of cartridge 17 and is closest to hub 22H (FIG. 6). Not shown is the usual hub access opening in housing 40 that is coaxial to hub 22H. As usual, cartridge receiver 16 only receives cartridge 17 in an orientation for always aligning aperture 41 with carriage 23.

Carriage 23 has wheels 45 in a low-friction rolling engagement with rails 24 (FIG'S. 3-5, 7). Rails 24 extend through cylindrical openings 61 (FIG. 7) of carriage 23 for guiding movement of carriage 23 along its travel path. Leaf spring 26 has a relatively low resilience such that actuating carriage 23 to move along the length of spring 26 urges spring 26 slightly toward stationary plate 35 enabling carriage movement to effect locking engagement between spring 26 and carriage 23. The longitudinal extent of spring 26 is parallel to the carriage 23 travel path, i.e. radial of disk 22. As best seen in FIG. 7, spring 26 is disposed between carriage 23 openings 61, therefore between rails 24. While spring 26 can be centered between rails 24, there is no requirement to so do. The FIG. 7 illustrates the relative position of carriage 23 with respect to spring 26, it is to be understood that this same relative position is maintained in the FIG'S. 1-6 illustrations.

FIG. 9 is a simplified machine operations chart showing controller 13 control for ejecting cartridge 17 and locking carriage 23 against movement. Other operations 70 are the usual controller 13 control of the illustrated disk drive. Machine-executed step 71 prepares the illustrated disk drive for ejecting cartridge 17 currently in play position 56. It is preferred that this action includes completing writing all data in any cache (not shown) to disk 22, allowing spin down of disk 22 to a stopped condition, etc. Machine-executed step 72 moves carriage 23 to the FIG. 4 illustrated predetermined position for locking carriage 23 against movement. Finally, machine-executed step 73 ejects the cartridge using a usual power actuation (not shown) of loader-unloader 16. The resultant movement of cartridge 17 to the load-unload position 53 releases spring 26 to lockingly engage latch detent 48. During steps 72 and 73 the usual servo positioning control of carriage 23 is maintained. After ejecting cartridge 17 with carriage 23 locked against movement, the servo power may be removed. From machine-executed step 73 other operations 70 resume.

While the invention has been particularly shown and described with reference to preferred embodiments thereof, it will be understood by those skilled in the art that various changes in form and details may be made therein without departing from the spirit and scope of the invention.

What is claimed is:

1. A cartridge media playing apparatus having a cartridge receiver movable between a load-unload position and a play position for receiving and yielding a cartridge in said load-unload position and for enabling access to a medium contained in said cartridge in said play position, said cartridge having a medium access opening, each medium in said cartridge having a plurality of spaced apart recording areas that are accessible through said medium access opening, said cartridge and said cartridge receiver, while said cartridge is received in said cartridge receiver, comprising a cartridge composite, the improvement including, in combination:

movable transducer support means disposed for reciprocating motions along a predetermined path across said medium access opening for accessing different ones of said recording areas on the medium;

sub-frame means supporting said movable transducer support means for said reciprocating motions;

resilient means having a contact portion and being stationarily mounted on said sub-frame means for yieldably urging said contact portion in a direction toward said medium access opening, said contact portion being positioned on said resilient means to engage said cartridge composite in said play position so that the contact portion is downwardly biased by the cartridge composite;

latch lock means on said moveable transducer support means and having a latch means;

catch lock means mounted on said resilient means and facing said latch lock means for engaging said latch lock means for retaining said movable transducer support means in a predetermined position aligned with said medium access opening, said catch lock means having an aperture for removably receiving said latch means such that said cartridge composite while in said load-unload position enables said resilient means for locking said movable transducer support means in said predetermined position and while in said play position disengaging said latch and catch lock means for freeing said movable transducer support means for said reciprocating motions.

2. The apparatus set forth in claim 1, further including, in combination:

said resilient means being a leaf spring stationarily mounted on said sub-frame means and extending along said predetermined path; and said contact portion being an upstanding portion on said leaf spring for engaging said cartridge composite while in said play position.

3. The apparatus set forth in claim 2, further including, in combination:

said contact portion of said leaf spring being disposed for movements transverse to said predetermined path in one extremity portion of said predetermined path;

said leaf spring having a fixed end portion affixed to said sub-frame means at a predetermined distance from said one extremity portion such that said leaf spring extends at a predetermined angle with respect to said reciprocating motions and toward said medium access opening; and said latch lock means including a beveled edge portion facing said one extremity such that as said movable transducer support means moves toward said predetermined position said beveled edge slidably engages said leaf spring for bending said leaf spring to move said contact portion away from said cartridge composite toward said sub-frame means for moving said latch lock means into a locking engagement with said catch lock means for retaining said movable transducer support means in said predetermined position.

4. The apparatus set forth in claim 3, further including, in combination;

said medium being an optical disk;
said optical disk having a spindle receiver;
a spindle drive means on said sub-frame means having a spindle facing said cartridge composite for removably engaging said spindle receiver;

said spindle drive means having an axis of rotation extending transverse to said predetermined path; and said axis of rotation being disposed in juxtaposition to said predetermined position.

5. The apparatus set forth in claim 4, further including, in combination:

said contact portion being an integral end portion of said leaf spring comprising an upstanding first section of said end portion and a U-bend shaped section at an extremity of said first section such that said U-bend shaped section opens facing away from said cartridge composite.

6. The apparatus set forth in claim 3, further including, in combination:

electronic circuits in the apparatus mounted on said sub-frame means for actuating said movable transducer support means to move along said predetermined path;

a controller connected to said electronic circuits for actuating said electronic circuits for actuating movable transducer support means to move along said predetermined path; and eject means in the controller and being connected to said electronic circuits for actuating said electronic circuits to move said movable transducer support means to said predetermined position and then enabling ejection of said cartridge from the apparatus.

7. The apparatus set forth in claim 1, further including, in combination:

said medium being an optical disk;
said optical disk having a spindle receiver;
a spindle drive means on said sub-frame means having a spindle facing said cartridge composite for removably engaging said spindle receiver;

said spindle drive means having an axis of rotation extending transverse to said predetermined path; and said axis of rotation being disposed in juxtaposition to said predetermined position.

8. An optical module for use in a media player, the module having a bottom portion and a top portion, said top portion having attachment means for attaching to a cartridge receiver for operatively engaging an optical disk having an axis of rotation, said cartridge receiver being movable axially of said optical disk between a load-unload position and a play position, said optical disk having a spindle hub and being rotatably disposed for rotation about said axis of rotation within a cartridge while said cartridge is received in said cartridge receiver in said play position, said cartridge having a disk access opening for enabling access to said disk from said cartridge, said optical disk having radially spaced-apart recording areas accessible through said disk access opening, said cartridge and said cartridge receiver, while said cartridge is received in said cartridge receiver, comprising a cartridge composite, a bottom surface on said cartridge composite having a predetermined contact portion, the module including, in combination:
sub-frame means:
transducer support means movably mounted on said sub-frame means for reciprocating motions along a predetermined path extending radially of said optical disk while said optical disk is in said play position and said reciprocating motions being coextensive of said disk access opening in said cartridge;

spindle drive means disposed in said bottom portion and mounted on said sub-frame means and being disposed adjacent one end portion of said predetermined path;

said spindle drive means having a spindle extending along said axis of rotation for receiving said spindle hub of the optical disk for rotating the optical disk about said axis of rotation, resilient means stationarily mounted on said sub-frame means in said bottom portion of said optical module and having a first end portion yieldably extending from said bottom portion of said optical module toward said top portion of said optical module;

said first end portion of said resilient means extending into said one end portion of said predetermined path;

a contact member mounted on said first end portion of said resilient means and facing said top portion of said module and being movably disposed for movements transverse to said predetermined path within said one end portion of said predetermined path for enabling contact with said predetermined contact portion of said bottom surface of said cartridge composite;

latch lock means on said transducer support means;

catch lock means on said resilient means and facing said latch lock means engaging said latch lock means for retaining said movable transducer support means fin said predetermined position; and said catch lock means being mounted on said first end portion of said resilient means for engaging said latch lock means only if said contact member is not contacting said predetermined contact portion of said cartridge composite in said load-unload position such that said cartridge composite while in said load-unload position enables said resilient means to lock said transducer support means is said predetermined position and while said cartridge composite in said play position said predetermined contact portion contacting said contact member of said resilient means for moving said contact member toward said bottom portion of said sub-frame means for disengaging said latch lock means and catch lock means for freeing said transducer support means for said reciprocating motions along said predetermined path.

9. The module set forth in claim 8, further including, in combination:

said resilient means being an elongated leaf spring having a fixed end portion fixedly mounted on said sub-frame means in said bottom portion of said optical module; said elongated leaf spring extending along said predetermined path; and said contact member being an upstanding portion on said leaf spring for engaging said cartridge composite while said cartridge composite is in said play position.

10. The module set forth in claim 9, further including, in combination:

said fixed end portion being affixed to said sub-frame means in said predetermined path at a predetermined distance from one extremity of said predetermined path such that said leaf spring extends at a predetermined angle with respect to said reciprocating motions and toward and from said media access opening; and said latch lock means including a beveled edge portion facing said one extremity such that as said, movable transducer support means moves toward said predetermined position said beveled edge slidably engages said leaf spring for bending said one end portion towards said sub-frame means for engaging said latch lock means into said catch lock means for retaining said movable transducer support means in said predetermined position.

11. The module set forth in claim 10, further including, in combination:

said contact member being an integral end portion of said leaf spring comprising an upstanding first section of said integral end portion and a U-shaped bend section at an extremity of said upstanding first section such that said U-shaped bend section opens facing away from said cartridge composite.

12. The module set forth in claim 11, further including, in combination:

electronic circuits mounted on said sub-frame means connected to said movable transducer support for actuating said movable transducer support means to move along said predetermined path in said reciprocating motions; and spindle circuit means connected to said spindle drive means for actuating the spindle drive means to rotate said optical disk.

* * * * *